United States Patent
Gnorski

(10) Patent No.: US 9,111,409 B2
(45) Date of Patent: Aug. 18, 2015

(54) FINANCIAL TRANSACTIONS PROCESSING SYSTEM INCLUDING CASH AUTOMATION MACHINE

(75) Inventor: Joseph Gnorski, Wheaton, IL (US)

(73) Assignee: Talaris Inc., Watertown, WI (US)

( * ) Notice: Subject to any disclaimer, the term of this patent is extended or adjusted under 35 U.S.C. 154(b) by 615 days.

(21) Appl. No.: 12/826,836

(22) Filed: Jun. 30, 2010

(65) Prior Publication Data

US 2012/0005073 A1    Jan. 5, 2012

(51) Int. Cl.
G06Q 30/00 (2012.01)
G07F 19/00 (2006.01)
G06Q 20/10 (2012.01)
G06Q 40/02 (2012.01)

(52) U.S. Cl.
CPC .............. *G07F 19/209* (2013.01); *G06Q 20/10* (2013.01); *G06Q 20/1085* (2013.01); *G06Q 40/02* (2013.01); *G07F 19/20* (2013.01); *B65H 2220/01* (2013.01)

(58) Field of Classification Search
CPC combination set(s) only.
See application file for complete search history.

(56) References Cited

U.S. PATENT DOCUMENTS

| | | | |
|---|---|---|---|
| 5,541,835 A * | 7/1996 | Dextraze et al. | 705/7.31 |
| 6,122,625 A * | 9/2000 | Rosen | 705/65 |
| 6,315,279 B1 | 11/2001 | Minamishin et al. | |
| 7,036,650 B2 | 5/2006 | Brugger et al. | |
| 7,475,044 B1 * | 1/2009 | Kawai et al. | 705/65 |
| 7,529,710 B1 * | 5/2009 | Clower et al. | 705/39 |
| 8,229,816 B1 * | 7/2012 | Mattison et al. | 705/35 |
| 2004/0030622 A1 * | 2/2004 | Ramos et al. | 705/35 |
| 2004/0099729 A1 * | 5/2004 | Utz et al. | 235/379 |
| 2005/0167482 A1 * | 8/2005 | Ramachandran et al. | 235/379 |
| 2005/0289056 A1 * | 12/2005 | Guinn | 705/43 |
| 2006/0289628 A1 * | 12/2006 | Gunst et al. | 235/379 |
| 2007/0045397 A1 * | 3/2007 | Ireland et al. | 235/379 |

OTHER PUBLICATIONS

J. Jordan, and J. Katz, "Banking in the Age of Information Technology" Quarter 4, 1999. (http://www.bostonfed.org/economic/nerr/rr1999/q4/katz99_4.htm).*

* cited by examiner

*Primary Examiner* — Ryan D. Donlon
*Assistant Examiner* — Asha Puttaiah
(74) *Attorney, Agent, or Firm* — Boyle Fredrickson, S.C.

(57) ABSTRACT

A financial transactions processing system includes a safe (cash automation machine) that performs transactions including at least one of receiving and distributing money. A controller, such as a teller computer, issues instructions to the cash automation machine to perform the transactions. A processor, such as a bank branch CPU, receives data from the cash automation machine and the controller relating to the transactions and analyzes the data. This data can include data relating to at least one of the following: number of transactions, duration of each transaction, type of each transaction, denomination of money distributed and/or received, and date and time of the transactions. The processor (bank branch CPU) can advantageously use this data in a number of ways, including at least one of the following: to accurately and effectively assign teller work schedules, perform or schedule maintenance or repairs, provide economic advantages, etc.

15 Claims, 5 Drawing Sheets

FINANCIAL TRANSACTIONS PROCESSING SYSTEM INCLUDING CASH AUTOMATION MACHINE

BACKGROUND

The exemplary embodiments relate to financial transactions processing systems and methods, which can be provided, for example, in banks and other financial institutions or environments.

A typical bank branch office, for example, includes a teller counter having one or more teller stations. The teller counter typically separates the branch office into a teller area on one side of the counter, and a customer area on the other side of the counter. In some banks, an additional transparent partition is located above the counter to further separate the teller area from the customer area. Stand-alone podiums containing one or more teller stations, around which tellers and customers can move, can be provided as an alternative, or in addition to, the teller counters.

Cash automation machines can be used at teller stations located at either the teller counters or stand-alone podiums. The cash automation machines can be used to more accurately, effectively and efficiently receive and distribute money, including paper money and/or coinage. An exemplary cash automation machine is in the form of a vault-level safe (e.g., UL-Rated 291 safe) positionable adjacent a teller or between adjacent tellers at a bank. The vault-level safe stores paper money and coinage based on respective denominations in separate receptacles.

A related art vault-level safe includes a dispenser and/or a recycler. In general, the dispenser dispenses money to a teller or customer, while the recycler receives money from the teller or customer and deposits the received money in the safe's receptacles. The recycler can also dispense money to either the teller or the customer.

SUMMARY

Cash automation machines, such as vault-level safes, can be operated through an electronic controller, such as a teller computer. The teller computer can be provided adjacent to, and operated by, a teller, enabling the teller to dispense and deposit money. Dispensing and depositing money in this manner can be more efficient and effective than traditional manual methods.

In such a system, the dispenser of the safe dispenses notes based on instructions from the teller computer. For example, in response to a customer's request for a withdrawal, the teller enters the desired amount of money as well as the desired denominations of money into the computer. The computer then transmits a dispensing instruction to the dispenser. The dispensing instruction causes the dispenser to extract money, including bills and/or coins, from their respective receptacles in the amounts necessary to satisfy the customer's request. The dispenser then counts the money and dispenses the money to the teller or the customer.

Also in such a system, the recycler receives money from the teller or customer and deposits the money in the safe's receptacles. For example, in response to a customer's request for a deposit, the teller takes the money from the customer and inserts it into the safe via a bill and/or coin slot. The recycler then takes the money and performs a number of operations thereon. For example, the recycler counts the money and determines the fitness and authenticity of the bills. After performing these operations, the recycler separates the money by denomination into the corresponding receptacles.

The above computer-controlled safe can be used as part of a larger financial transactions processing system. For example, as shown in FIG. 1, the safe (cash automation machine) 100 receives instructions from, and is controlled by, a teller computer 400. However, the teller computer 400 can also provide information to, and receive instructions from, another processor, such as a bank branch CPU 200.

The larger system can provide enhanced efficiencies and advantages by virtue of the interaction between the teller computer 400 and the bank branch CPU 200. Software, such as staffing software, can be used by the bank branch CPU 200 and/or the teller computer 400 to use information related to operations performed by the teller computer 400 to achieve various advantages. For example, the staffing software can receive data from the teller computer 400 identifying, among other things, the number of transactions processed over a specified period of time. Based on the received data, the staffing software can perform various calculations, such as to determine the amount of work being performed by the tellers over a specified period, and further use this information to estimate or anticipate the number of tellers required to process the transactions over the given period.

More specifically, the data received from a week's worth of bank transactions may show that the bank processed a large amount of transactions between the hours of 12:00-1:00 PM on weekdays, and also processed a large amount of transactions on Saturday. In addition, the data may show that a particularly low amount of transactions were performed on Wednesday mornings. Based on this data, the staffing software may be used to predict the number of transactions and work that will need to be performed by tellers at various times and on various days in the future and schedule the number of tellers accordingly. For example, the software may schedule additional tellers to work during the weekday lunch hours as well as on Saturdays, and may schedule fewer tellers on Wednesday mornings.

As discussed above, vault-level safes can be controlled by teller computers to enable banks to more accurately and efficiently handle cash transactions than traditional manual methods. Larger systems, in which the bank CPU 200 uses staffing software to use information related to the operations performed by the teller computer 400, can further enhance efficiencies, such as by anticipating or predicting the amount of work that tellers need to perform on various days and at various times, so as to more accurately and effectively assign teller work schedules.

However, the effectiveness of the above system shown in FIG. 1 is limited to the information that the branch CPU 200 gleans from the teller computer 400 via the staffing software. The system's effectiveness could be further enhanced if the branch CPU took into account additional information beyond that received from the teller computer. For example, information directly related to, or received from, the safe (cash automation machine) can be used to further enhance bank operations. In other words, data received from the safe (cash automation machine), and not available from the teller computer, can be advantageously used, such as to even more accurately and effectively assign teller work schedules, perform or schedule maintenance or repairs, provide economic advantages, etc. This data received from the safe can include data relating to at least one of the following: number of transactions, duration of each transaction, type of each transaction, denomination of money distributed and/or received, and date and time of the transactions.

Thus, in accordance with an exemplary embodiment, a financial transactions processing system includes a safe (cash automation machine) that performs transactions including at least one of receiving and distributing money. A controller, such as a teller computer, issues instructions to the cash automation machine to perform the transactions. A processor, such as a branch CPU, receives data from the cash automation machine and the controller relating to the transactions and analyzes the data. In one exemplary embodiment, the safe (cash automation machine) is adjacent the controller (teller computer) and remote from the processor (branch CPU).

The safe (cash automation machine) can include: a receiving unit that receives the instructions from the controller; a transaction unit that performs transactions including at least one of distributing money based on the instructions received from the controller and receiving money; a data collection unit that collects data relating to the transactions; and a transmission unit that transmits the data collected by the data collection unit to the processor. The processor (branch CPU) can include: a communication unit that receives the data from the transmission unit of the cash automation machine; and a management unit that analyzes the data received by the communication unit.

The management unit of the processor can include a staffing unit that analyzes the data received by the communication unit, including data relating to duration of each transaction, determines an amount of work to be performed over a specified period, and estimates an optimum number of workers to perform the determined amount of work over the specified period. Alternatively, the management unit of the processor can include a staffing unit that: receives and analyzes the data from the controller to prepare an initial estimate of an amount of work to be performed over a specified period; and receives and analyzes the data from the transmission unit of the cash automation machine to update the initial estimate, and determines an optimum number of workers to perform the updated estimated amount of work over the specified period.

The data collection unit of the cash automation machine can perform other functions, such as generating a log of data relating to the transactions. The communication unit of the processor can then transmit a log request to the data collection unit to instruct the data collection unit to generate and transmit a log of the data relating to the transactions to the processor.

The cash automation machine can also include an error sensing unit that detects an operating error, generates an error message, and transmits the error message including data relating to the error to the processor. The management unit of the processor can then include a monitoring unit, such that upon receipt of the error message, the monitoring unit analyzes the data relating to the error and provides instructions to a user at the cash automation machine for correcting the error. Alternatively, the management unit of the processor can include a monitoring unit, such that upon receipt of the error message, the monitoring unit analyzes the data relating to the error and communicates with a central station remote from the cash automation machine to instruct service personnel to correct the error. The error message in either embodiment can include at least one of data identifying the cash automation machine that generated the error message, a description of the sensed error, and a timestamp indicating the time and date of the sensed error.

The cash automation machine can transmit the data collected by the data collection unit at various times. For example, the transmission unit of the cash automation machine can transmit the data collected by the data collection unit to the processor after each transaction. Alternatively, the communication unit of the processor can transmit a request to the transmission unit of the cash automation machine to transmit the data collected by the data collection unit to the processor. As yet another alternative, the transmission unit of the cash automation machine can transmit the data collected by the data collection unit to the processor at predetermined intervals.

The exemplary embodiments are described herein in the context of a financial transactions processing system that includes a cash automation machine, a teller computer, and a bank branch CPU. However, it is envisioned that any system for receiving and distributing objects, whether financial or not, is encompassed by the spirit and scope of the exemplary embodiments.

BRIEF DESCRIPTION OF THE DRA WINGS

DETAILED DESCRIPTION OF EMBODIMENTS

Figure 1:
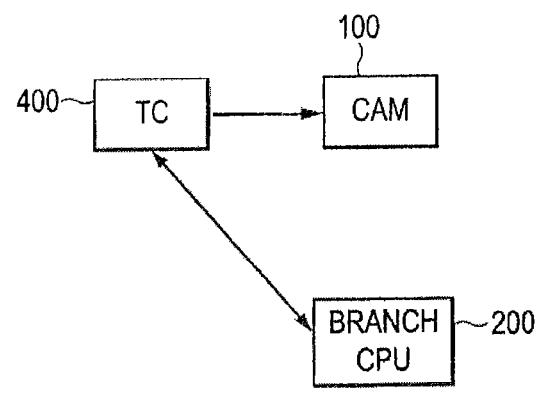
FIG. 1 is a schematic of a financial transactions processing system in which a branch CPU uses information from a teller computer to achieve various advantages.
Figure 2:
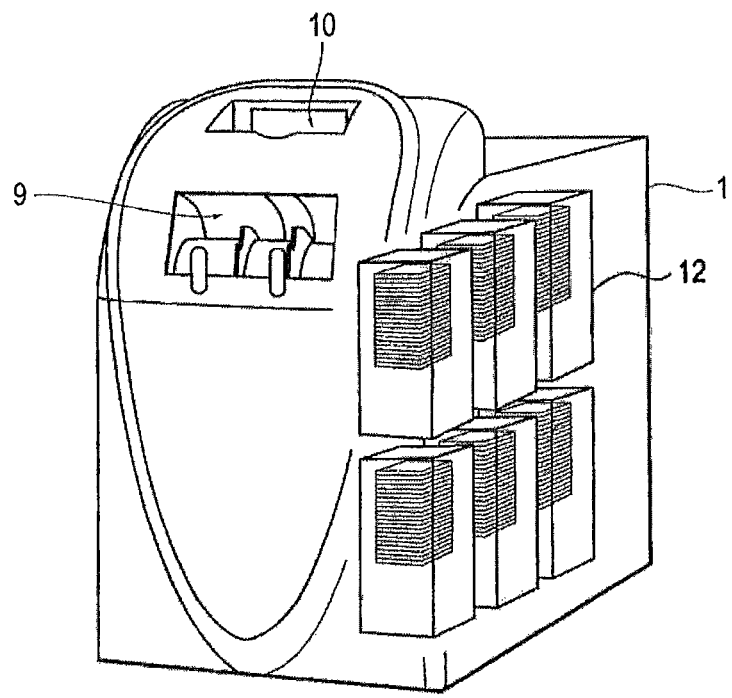
FIG. 2 is a partially cut-away perspective view of a cash automation machine.

A financial transactions processing system according to an exemplary embodiment includes a cash automation machine 1 shown in FIG. 2, which can be a vault-level safe, such as a UL-Rated 291 safe. The cash automation machine 1 can be used in a bank: such as adjacent teller stations located at either teller counters or stand-alone podiums. The cash automation machine 1 can alternatively be disposed at other locations, such as under a counter, in a wall, integrated into bank: furniture, or on the floor as a stand-alone unit.

The cash automation machine 1 can include a teller cash dispenser and/or recycler in a single housing to perform transactions. The teller cash dispenser dispenses money to either a teller or directly to a customer. The teller cash recycler receives currency, such as during a deposit transaction, and then, after confirming the authenticity of the currency, deposits the money received in the safe's receptacles. The recycler can also dispense currency, such as during a withdrawal transaction, to either the teller or directly to the customer.

As shown in FIG. 2, the cash automation machine 1 includes a note deposit slot 9, a note output slot 10, and multiple note storage receptacles 12 that store various denominations of paper money. Money can be inserted into the deposit slot 9 to be deposited into the storage receptacles 12. Money can also be transferred from the receptacles 12 to the output slot 10 for distribution.

Figure 3:
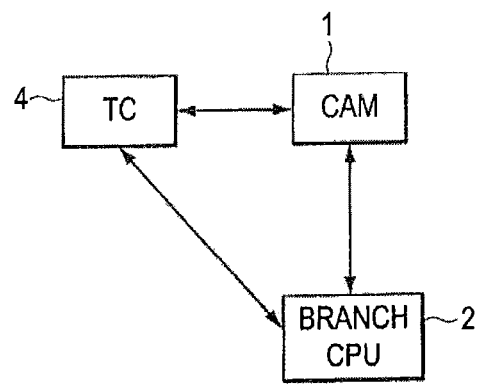
FIG. 3 is a schematic of a financial transactions processing system in which a branch CPU uses information from both a teller computer and a cash automation machine to achieve advantages beyond those provided by the system of FIG. 1.

As shown in FIG. 3, in addition to the cash automation machine 1, the financial transactions processing system includes a processor, such as a bank branch CPU 2, and a controller, such as a teller computer 4. In general, the teller computer 4 issues instructions to the cash automation machine 1 to perform the transactions. The branch CPU 2 receives data from the cash automation machine 1 and the teller computer 4 relating to the transactions and analyzes the data. In one exemplary embodiment, the cash automation machine 1 is adjacent the teller computer 4 and remote from the branch CPU 2.

Figure 4:
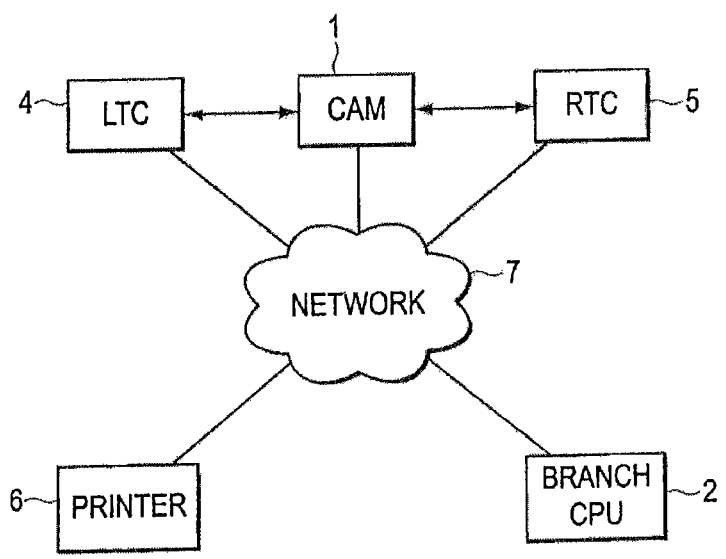
FIG. 4 is a schematic of an exemplary embodiment of the financial transactions processing system of FIG. 3.

The cash automation machine 1, bank: branch CPU 2, and teller computer 4 can be arranged in numerous configurations. For example, as shown in FIG. 4, a cash automation machine 1 is connected to a left teller computer 4 and a right teller computer 5, such that the teller computers 4 and 5 can send commands directly to the cash automation machine 1. The branch CPU 2 and a printer 6 are connected to the cash automation machine 1 and teller computers 4 and 5. The branch CPU 2 can be a computer that is accessible by employees of the bank, such as branch managers, and can operate management software including staffing software. The printer 6 can be used to run reports, print error logs, etc., associated with the various devices. The cash automation machine 1, left and right teller computers 4 and 5, branch CPU 2 and printer 6 can be all interconnected to one another via a network 7, such as a Local Area Network, Internet, or other suitable devices or systems.

In an exemplary embodiment, the branch CPU 2 operates the management software including the staffing software. Running the software on a machine separate from the teller computers prevents conflicts with the tellers' responsibilities. The management software includes the staffing software as well as other functions. As discussed above, the staffing software receives data inputs from the left and right teller computers 4 and 5 relating to various details of the bank transactions processed by those terminals. For example, the data may include the times of the transactions and the types of the transactions (e.g. cash, new accounts, money transfers, etc.), as well as other types of data.

Figure 5:
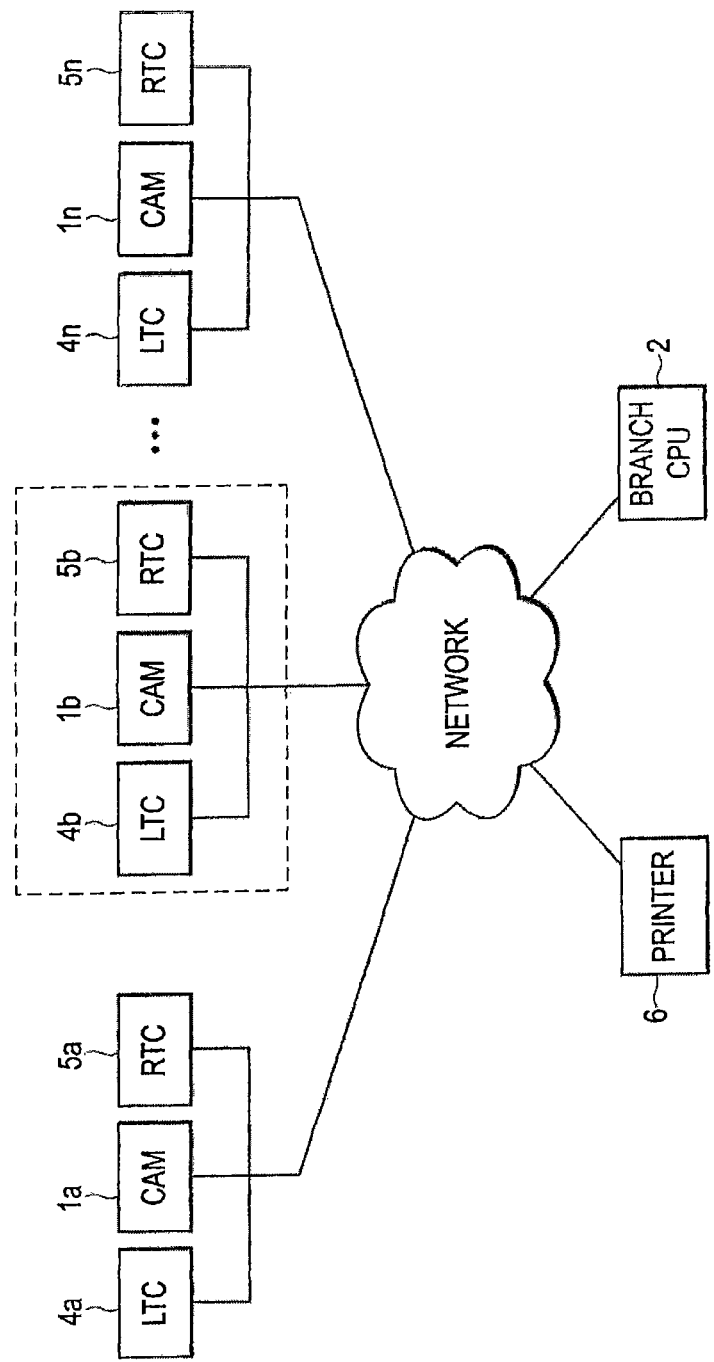
FIG. 5 is a schematic of another exemplary embodiment of the financial transactions processing system of FIG. 3.

FIG. 5 shows another exemplary configuration of cash automation machines 1. Each cash automation machine 1 is positioned between and connected to nearby teller computers 4 and 5. Preferably, each cash automation machine 1 is connected to two teller computers, a left teller computer 4 and a right teller computer 5. Optionally, one of the cash automation machines 1 may be connected only to one nearby teller computer, or alternatively, to three or any number of nearby teller computers.

Figure 6:
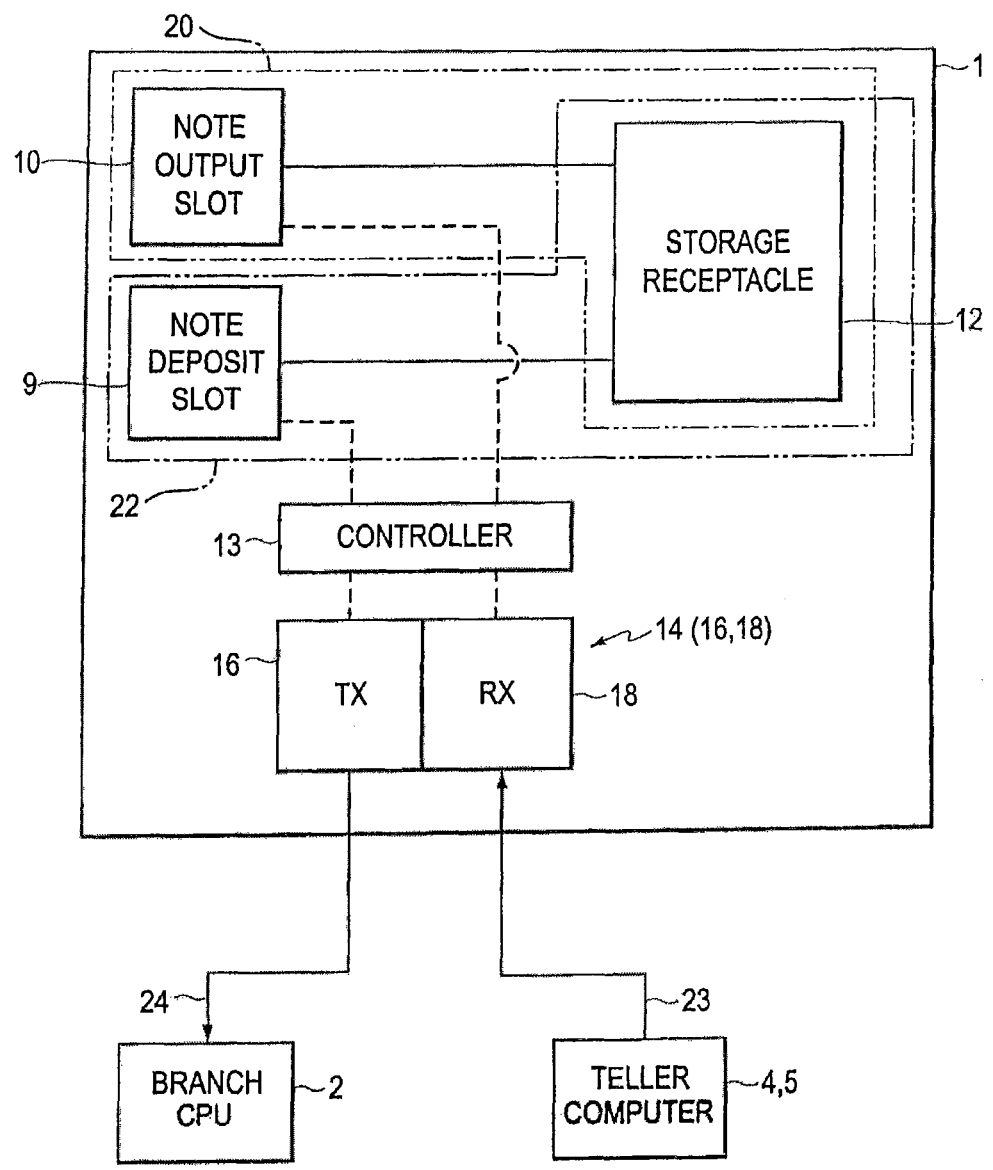
FIG. 6 is a schematic of a cash automation machine, branch CPU and teller computer in accordance with an exemplary embodiment of the financial transactions processing system of FIG. 3.

FIG. 6 shows additional features of a cash automation machine 1. The note deposit slot 9 coupled with the storage receptacles 12 constitutes the recycler 22, while the note output slot 10 coupled with the storage receptacles 12 constitutes the dispenser 20. A transmitting/receiving unit 14 includes a receiving unit 18 for receiving instructions from the teller computers 4 and 5 and a transmission unit 16. A controller 13 is also provided for controlling the various operations of the cash automation machine 1 as well as integrating the dispenser 20 and the recycler 22 with the communication unit 14. The controller also includes an error sensing unit and data collection unit discussed below. Additional features and functionality are omitted because they are not necessary to the present invention.

The teller computers 4 and 5 are each connected to the receiving unit 18 of the cash automation machine 1 via an instruction link 23. The branch CPU 2 is connected to both the receiving unit 18 and the transmission unit 16 of the cash automation machine 1 via a communications link 24. The instruction link 23 and communications link 24 are intended to cover any currently known or later developed system for carrying electrical signals, e.g., Universal Serial Bus (USB), Ethernet Cable, Firewire, etc. Through the instruction link 23, the cash automation machine 1 receives the instructions for dispensing money from the teller computers 4 and 5. For example, teller computer 4 may issue an instruction to the cash automation machine 1 via the instruction link 23 to dispense $100 to a customer in $20 denominations. The cash automation machine 1 will receive the instruction in its receiving unit 18. The receiving unit 18 then forwards the instruction to the controller 13, which causes the controller 13 to carry out the instruction. Specifically, the controller 13 causes the dispenser 20 to extract five $20 notes from the corresponding storage receptacle 12 and dispense the notes to the note output slot 10.

For a deposit, the teller simply places the surrendered notes into the note deposit slot 9 of the safe. The controller 13 senses the presence of the notes in the note deposit slot 9 and causes the recycler 22 to remove the notes from the note deposit slot 9, separate the notes by denomination, and place the notes into the corresponding receptacles 12.

Figure 7:
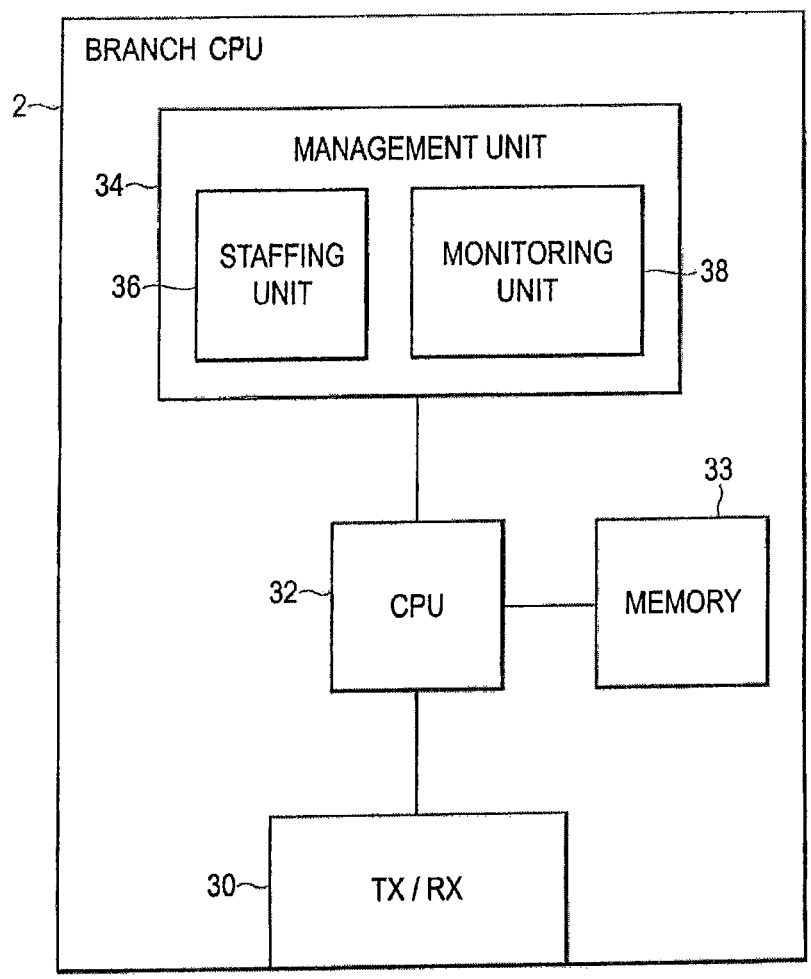
FIG. 7 is a schematic of a branch CPU in accordance with an exemplary embodiment of the financial transactions processing system of FIG. 3.

FIG. 7 is a schematic of the branch CPU 2. As shown in FIG. 7, the branch CPU 2 has a communication unit 30 for transmitting and receiving information with the teller computer(s) as well as with the cash automation machine(s). The communication unit 30 is connected with a CPU 32 for controlling the various operations of the branch CPU 2. A memory 33 for storing data is connected to the CPU 32. The memory 33 can be any currently known or later developed electrical signal storage system. A management unit 34 is also connected to the CPU 32. The management unit 34 contains a staffing unit 36 and a monitoring unit 38. As will be described in further detail below, the staffing unit 36 receives data from the teller computers 4 and 5 and the cash automation machine 1 for making determinations, such as an optimal staffing schedule, and the monitoring unit 38 communicates with the cash automation machine 1 for performing various additional functions.

In the present exemplary embodiment, the cash automation machine 1 transmits data to the branch CPU 2 after each transaction. Specifically, the communication unit 30 of the branch CPU 2 maintains an open communication link with the cash automation machines 1 *a*-1 *n*. For each transaction, the controller 13 of the cash automation machine 1 tracks various properties of the transaction. For example, the controller will track the date and time of the requested transaction, the duration of time that it took for the cash automation machine 1 to complete the cash transaction (how long it took to dispense the money requested or to recycle the money deposited), the specific denominations dispensed or deposited, the number of notes to be taken out of circulation based on condition or authenticity, and the number of notes of each denomination remaining in the storage receptacles 12, etc. After the transaction has been completed, the controller 13 forwards the data to the transmission unit 16, which transmits the data to the branch CPU 2 via the communications link 24.

The branch CPU 2 receives the data in its communication unit 30 from the communications link 24. The branch CPU 2 also receives information from the teller computers, as discussed above. The communication unit 30 forwards the data to the CPU 32, which parses the data based on its type. The CPU 32 then sends the data to be used in making various determinations, such as determining the staffing schedule, to the staffing unit 36, and forwards the data to be used in the monitoring operations of the branch CPU 2 to the monitoring unit 38 (the data can be stored in the memory 33 of the branch CPU 2 and later forwarded to the staffing unit 36 and monitoring unit 38, as necessary). The data sent to the staffing unit 36 and the data sent to the monitoring unit 38 may have data components that differ from one another, and may have other data components that are the same. For example, data indicating the duration of the transaction may be sent only to the staffing unit 36. On the contrary, data indicating the amount of notes remaining in each storage receptacle 12 may be forwarded to both the staffing unit 36 and the monitoring unit 38.

Upon receipt of the data from the CPU 32, the staffing unit 36 will apply not only the data from the teller computers 4 and 5, but also the data from the cash automation machine 1 for making various determinations, such as determining an optimal staffing schedule. Specifically, the staffing unit 36 analyzes the data received from the teller computer(s) as well as the data from the cash automation machine(s). Based on the analysis, the staffing unit 36 will determine an optimal staffing schedule that fully factors the efficiency gained from the use of the cash automation machine(s). As a result, the bank will be able to schedule an optimal number of tellers at given times, allowing the bank to effectively reduce its overhead costs while ensuring that the services to its customers are maintained.

In addition to the staffing unit 36, the monitoring unit 38 also receives data. In particular, the monitoring unit 38 is configured to monitor the status of the cash automation machine(s). For example, the controller 13 of the cash automation machine 1 detects errors in the operation of the cash automation machine 1. These errors may be, for example, low inventory in a storage receptacle 12, paper jams, mechanical failures, communication errors, etc. The controller 13, upon detecting such an error, initiates the communication of an error message to the branch CPU 2. The communication unit 30 receives the error message via the communications link 24. The communication unit 30 then forwards the message to the CPU 32, which identifies the message as an "error message," and forwards the message to the monitoring unit 38. Upon receiving the error message, the monitoring unit 38 performs either of the following options depending on the severity of the error: (1) if the error is simple enough to be handled by an employee of the bank, the monitoring unit 38 may output instructions to the display 40 of the branch CPU 2, or to a display (not shown) of the teller computers associated with the malfunctioning cash automation machine 1; or (2) if the error is severe, such that the error requires professional servicing, the monitoring unit 38 may compile a log detailing the error and identifying the malfunctioning cash automation machine 1 and perform a service call to a technical service specialist, forwarding the compiled log. Even if the error is simple, such as in (1), the monitoring unit 38 may still compile an error log to report the error to technical service.

This functionality provides significant advantages because it allows errors to be handled extremely efficiently and quickly. In addition, because errors are reported to appropriate personnel, the manufacturer of the machines may monitor the conditions of the cash automation machines being employed by the bank. As a result of tracking the number of errors and service calls, the manufacturer can identify machines that should be withdrawn from circulation.

The monitoring unit 38 may also be used to actively check the status of the cash automation machine(s). For example, the monitoring unit 38 may be instructed (by a user or on a periodical basis) to initiate a log request to one or more of the cash automation machine 1. Upon receiving the log request, the controller 13 of the designated cash automation machine 1 will access its memory and forward the requested logs to the branch CPU 2. In this manner, data from the cash automation machine(s) 1 may be obtained on demand. Further, by retrieving these logs, the bank may be able to better track the use of the various cash automation machine(s) 1. Lastly, if data of only some of the operating cash automation machines 1 is desired, the monitoring unit 38 may access this data easily and efficiently.

The above exemplary embodiment provides several advantages. In addition to the advantages described above, by establishing an open two-way communication link between the cash automation machine(s) 1 and the branch CPU 2, no significant additional hardware is required in the cash automation machine 1. Specifically, as discussed above, related art cash automation machines may already contain some form of a receiving unit, which can be modified to include a transmitting unit. Thus, banks that currently operate related art cash automation machines could easily upgrade without significant difficulty or cost. In addition, because of similarities, the current manufacturer of cash automation machines may need to make only minor alterations for production.

In an alternative embodiment, the cash automation machine 1 can be provided with its own internal memory. Specifically, although the cash automation machine 1 of the above exemplary embodiment contains a memory for storing log data, the memory could be small and temporary, such as cache or RAM memory. However, by providing the cash automation machine 1 with a more substantial permanent memory, such as a magnetic Hard Disk Drive (HDD), for example, the alternative cash automation machine 1 can record the tracked data in its own memory. As a result, the data can be uploaded to the branch CPU 2, either at predetermined times or upon request from the branch CPU 2.

For example, if the staffing unit 36 is configured to determine staffing schedules on a weekly basis, the cash automation machine 1 may store the data in its memory and only upload the data to the branch CPU once a week. Alternatively, or in addition, the cash automation machine 1 can be configured to store the data in its memory, and to upload the data to the branch CPU 2 upon request from the branch CPU 2. The cash automation machine 1 could further be configured to delete data stored in its memory on a periodical basis, after the data is uploaded, etc.

This alternative embodiment provides other advantages. For example, by uploading data only at certain times, or only upon request, there is less stress on the branch CPU 2, and also less stress and congestion on the network 7. For example, as discussed above, the branch CPU 2 may actually be a teller computer 4 or 5. Thus, the teller must use the computer when performing the various transactions requested by the customers. If data from multiple cash automation machines 1 are regularly being sent to the teller computer 4 or 5, the computing speed of the teller computer 4 or 5 may slow significantly, resulting in longer transaction times for customers. Thus, the number of transactions the bank is capable of completing may be reduced. By withholding the data on the cash automation machine 1, the teller computer's performance can be maintained, allowing the teller to quickly and efficiently process bank transactions.

Yet another alternative embodiment may use the configuration of either of the preceding exemplary embodiments. In this alternative embodiment, the staffing unit 36 of the branch CPU 2 contains an efficiency value calculation unit. The staffing unit 36 determines an initial staffing schedule based only on the data received from the teller computers 4 and 5 using any known or later developed method. The efficiency value calculation unit then calculates an efficiency value based on the data received from the cash automation machine 1. The efficiency value indicates the number of tellers by which the staffing schedule can be reduced based on the extra efficiency gained from the use of the cash automation machine 1. In other words, the efficiency value calculation unit 36 determines the efficiency gained from the use of the cash automation machine(s) based on the data received from those cash automation machine(s). The staffing unit 36 then extracts the efficiency value from the efficiency value calculation unit, and adjusts the initial staffing schedule by the efficiency value such that the staffing schedule can be fully optimized based on the advantages gained from the cash automation machine(s).

This alternative exemplary embodiment provides an advantage in that the related art staffing software can be easily modified or upgraded. Specifically, the software can be used to calculate the initial schedule. The software can then be upgraded with a short efficiency value calculation module for determining the efficiency gained from the cash automation machine(s). This calculation can be simply applied to the initial schedule to produce the optimal staffing schedule. Thus, only minor and inexpensive modifications can be made to related art software modules.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A financial transactions processing system that processes monetary transactions, comprising:
   a cash automation machine including a cash automation controller executing transaction performance instructions received at a communication unit over a first network connection and stored in a non-transitory cash automation memory, the transaction performance instructions received over the first network connection including one or more steps directing the cash automation machine to perform transactions including at least one of receiving and distributing money;
   a bank teller computer including a bank teller processor, the bank teller processor configured to receive transaction information and execute bank teller instructions stored in a non-transitory bank teller memory, the bank teller instructions including one or more steps directing the bank teller processor to transmit the transaction instructions to the cash automation machine to perform the transactions over the first network connection;
   the first network connection operably connecting the cash automation machine to the bank teller computer; and
   a bank branch computer including a bank branch processor including management software stored in a non-transitory branch computer memory, the management software including steps for:
      receiving data from the cash automation machine over a second network connection and from the bank teller computer over a third network connection, the transaction information data including data relating to the transactions,
      the second network connection operably connecting the cash automation machine to the bank branch computer and the third network connection operably connecting the bank branch computer to the bank teller computer;
      storing the received transaction data in the non-transitory branch computer memory, and
      generating instructions modifying the operation of at least one of the cash automation machine, the bank teller computer and the bank branch computer based on the received transaction data.

2. The financial transactions processing system of claim 1, wherein the cash automation machine includes: a receiving unit that receives the instructions from the bank teller computer; a transaction unit that performs transactions including at least one of distributing money based on the instructions received from the controller and receiving money; a data collection, unit that collects data relating to the transactions; and a transmission unit that transmits the data collected by the data collection unit to the processor.

3. The financial transactions processing system of claim 2, wherein the bank branch computer includes: a communication unit that receives the data from the transmission unit of the cash automation machine; and a management unit executing the management software that analyzes the data received by the communication unit.

4. The financial transactions processing, system of claim 3, wherein the data that the communication unit of the bank branch computer receives includes data relating to at least one of number of transactions, duration of each transaction, type of each transaction, denominations of money distributed or received, and date and time of the transactions.

5. The financial transactions processing system of claim 4, wherein the management unit of the bank branch computer includes a staffing unit that analyzes the data received by the communication unit, including data relating to duration of each transaction, determines a projected amount of work, calculated based on a sum of the duration of each transaction for all transactions reported to the communication unit over a specified period, to be performed over the specified period in the future, and estimates a number of workers needed to perform the determined projected amount of work, over the specified period in the future.

6. The financial transactions processing system of claim 4, wherein the management unit of the bank branch computer includes a staffing unit that: receives and analyzes the data from the bank teller computer to prepare an initial estimate of a projected amount of work, calculated based on a sum of the duration of each transaction for all transactions reported from the bank teller computer, to be performed over the specified period in the future; and receives and analyzes the data from the transmission unit of the cash automation machine to update the initial estimate, and determines a number of workers needed to perform the updated estimated amount of work over the specified period in the future.

7. The financial transactions processing system of claim 3, wherein the data collection unit of the cash automation machine generates a log of data relating to the transactions, and the communication unit of the bank branch computer transmits a log request to the data collection unit to instruct the data collection unit to generate and transmit a log of the data relating to the transactions to the bank branch computer.

8. The financial transactions processing system of claim 3, wherein the cash automation machine includes an error sensing unit that detects an operating error, generates an error message, and transmits the error message including data relating to the error to the bank branch computer.

9. The financial transactions processing system of claim 8, wherein the management unit of the bank branch computer includes a monitoring unit, such that upon receipt of the error message, the monitoring unit analyzes the data relating to the error and provides instructions to a user at the cash automation machine for correcting the error.

10. The financial transactions processing system of claim 8, wherein the management unit if the bank branch computer includes a monitoring unit, such that upon receipt of the error message, the monitoring unit analyzes the data relating to the error and communicates with a central station remote from the cash automation machine to instruct service personnel to correct the error.

11. The financial transactions processing system of claim 8, wherein the error message includes at least one of data identifying the cash automation machine that generated the error message, a description of the sensed error, and a timestamp indicating the time and date of the sensed error.

12. The financial transactions processing system of claim 2, wherein the transmission unit of the cash automation machine transmits the data collected by the data collection unit to the bank branch computer after each transaction.

13. The financial transactions processing system of claim 2, wherein the communication unit of the processor transmits a request to the transmission unit of the cash automation machine to transmit the data collected by the data collection unit to the bank branch computer.

14. The financial transactions processing system of claim 2, wherein the transmission unit of the cash automation machine transmits the data collected by the data collection unit to the bank branch computer at predetermined intervals.

15. The financial transactions Processing system of claim 1, wherein the cash automation machine is adjacent the bank teller computer and remote from the bank branch computer.

* * * * *